United States Patent [19]

Deckers et al.

[11] Patent Number: 5,489,633
[45] Date of Patent: Feb. 6, 1996

[54] MOLDING MATERIALS HAVING STRESS CRACKING RESISTANCE AND BASED ON PMMA/SAN BLENDS

[75] Inventors: Andreas Deckers, Flomborn; Daniel Wagner, Bad Duerkheim; Guenter Zimmer, Mainz, all of Germany

[73] Assignee: BASF Aktiengesellschaft, Ludwigshafen, Germany

[21] Appl. No.: 249,704

[22] Filed: May 26, 1994

[30] Foreign Application Priority Data

Jun. 1, 1993 [DE] Germany .................. 43 18 077.9

[51] Int. Cl.$^6$ ............... C08K 5/3435; C08K 5/3495; C08K 5/524; C08K 5/10
[52] U.S. Cl. ............... 524/91; 524/102; 524/153; 524/291
[58] Field of Search ............... 524/91, 102, 153, 524/291, 151, 222

[56] References Cited

U.S. PATENT DOCUMENTS 4,110,306  8/1978  Minagawa et al. ............... 524/102
5,096,949  3/1992  Lai et al. ............... 524/153

FOREIGN PATENT DOCUMENTS 243319  10/1987  European Pat. Off. .
508173  3/1992  European Pat. Off. .

OTHER PUBLICATIONS

Effect of copolymer composition . . . Fowler et al., Polymer, 1987 vol. 28, Jun.

(List continued on next page.)

*Primary Examiner*—Kriellion S. Morgan
*Attorney, Agent, or Firm*—Keil & Weinkauf

[57] ABSTRACT

Molding materials having stress cracking resistance containing

A) from 49 to 99% by weight of a polymer obtainable by polymerizing a $C_1$–$C_{20}$-alkyl ester of methacrylic or acrylic acid or a mixture of said esters, B) from 0.95 to 50% by weight of a polymer obtainable by polymerizing a monomer mixture comprising $b_1$) from 75 to 82% by weight of a vinyl aromatic monomer and $b_2$) from 18 to 25% by weight of acrylonitrile or methacrylonitrile or a mixture thereof, and C) from 0.05 to 1% by weight of a mixture containing $c_1$) a triaryl phosphite of the formula I

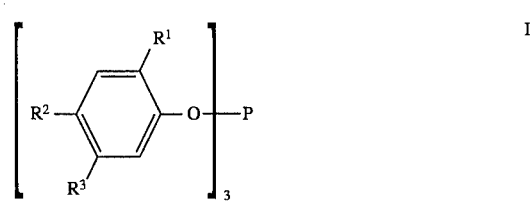

$c_2$) an amine of the formula II

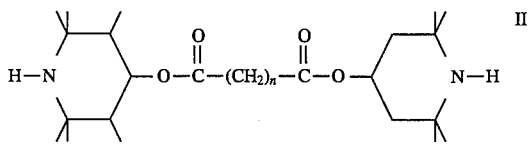

where n is from 2 to 10, $c_3$) a benzotriazole of the formula III

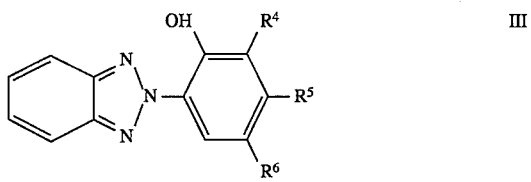

and $C_4$) a phenol.

6 Claims, 1 Drawing Sheet

OTHER PUBLICATIONS

Chemie, Physik und Technologie . . . , vol. 9, Acryl– und Methacrylverbindungen Springer–Verlag, 1967, p. 254 et seq.

Kunststoffhandbuch, vol. 9, Vieweg und Esser; Polymethylmethacrylat, Carl–Hanser–Verlag, Munich 1975, p. 36 et seq.

Polystyrol, Carl–Hanser–Verlag, Munich 1969, p. 124 et seq.

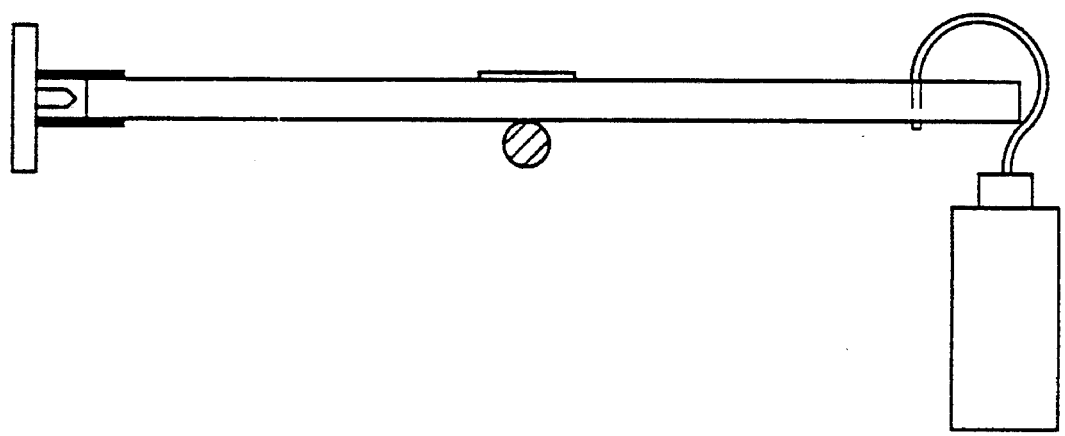
Figure

MOLDING MATERIALS HAVING STRESS CRACKING RESISTANCE AND BASED ON PMMA/SAN BLENDS

The present invention relates to molding materials having stress cracking resistance and containing essentially A) from 49 to 99% by weight of a poller obtainable by polymerizing a $C_1$–$C_{20}$-alkyl ester of methacrylic or acrylic acid or a mixture of said esters, B) from 0.95 to 50% by weight of a poller obtainable by polymerizing a monomer mixture comprising
  $b_1$) from 75 to 82% by weight of a vinyl aromatic monomer and
  $b_2$) from 18 to 25% by weight of acrylonitrile or methacrylonitrile or a mixture thereof, and C) from 0.05 to 1% by weight of a mixture containing
  $c_1$) a triaryl phosphite of the formula I

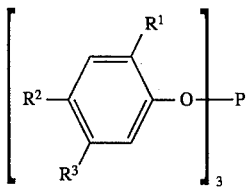

where $R^1$ and $R^2$ are each $C_1$–$C_{12}$-alkyl, $C_5$–$C_8$-cycloalkyl, $C_6$–$C_{10}$-aryl or $C_6$–$C_{10}$-aryl-$C_1$–$C_4$-alkyl, where the aryl radicals may be monosubstituted, disubstituted or trisubstituted by $C_1$–$C_4$-alkyl, and $R^3$ is hydrogen or $C_1$–$C_4$-alkyl, $c_2$) an amine of the formula II

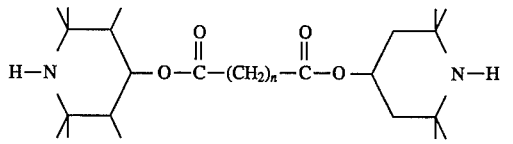

where n is from 2 to 10, $c_3$) a benzotriazole of the formula III

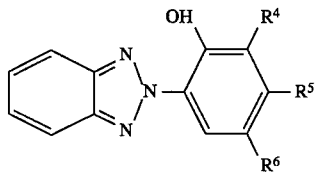

where $R^4$, $R^5$ and $R^6$ have the meanings of $R^1$, and $c_4$) a phenol of the general formula IV $$AB_k \qquad \text{IV}$$

where k is 1, 2 or 4 and, if k is 1, A is —COOR$^7$, —CONHR$^7$ or

where $R^7$ is $C_1$–$C_{21}$-alkyl, and, if k is 2, A is —CONH—$(CH_2)_n$—CONH—,

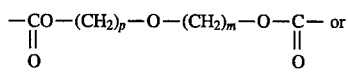

-continued $$-\underset{\underset{O}{\|}}{C}-O-(CH_2)_p-O-\underset{\underset{O}{\|}}{C}-$$

where p and m are each integers of from 1 to 10, and, if k is 4, A is

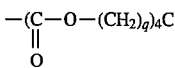

where q is an integer of from 1 to 4, and B is

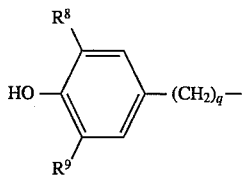

where $R^8$ and $R^9$ are each hydrogen, methyl or tert-butyl.

The present invention furthermore relates to a process for the preparation of these molding materials having stress cracking resistance, their use for the production of moldings and moldings containing said molding materials.

Polymethyl methacrylate (PMMA) is known to have very good weathering stability, high transparency and high scratch resistance. Compared with other transparent thermoplastics, however, PMMA tends to form stress cracks under the action of chemicals (for example alcohols, cleaning agents, etc.), some of which cracks may lead to breakage of the shaped article. For this reason, PMMA is unsuitable for certain potential applications.

There has been no lack of attempts to improve the resistance of acrylate plastics to chemicals. For example, Röhm, Darmstadt, offers a terpolymer of MMA/S/MSA (MMA=methyl methacrylate, S=styrene, MSA=maleic anhydride) (Plexiglas® HW 55) having high heat distortion resistance and improved resistance to various solvents.

It is known that the stress cracking resistance of MMA polymers can also be improved by copolymerization with acrylonitrile (Chemie, Physik und Technologie der Kunststoffe, Vol. 9, Acryl- und Methacrylverbindungen, Springer-Verlag, 1967, page 254 et seq.). The disadvantage here, however, is the reduced light transmittance as a result of the separation during the polymerization.

Blends of PMMA and SAN (styrene/acrylonitrile) copolymers having an acrylonitrile content of from about 19–25% by weight are as a rule miscible to give a molecular disperse product and result in transparent materials (Polymer 28 (1987), 1177). It is known from earlier investigations that such blends likewise have a substantially lower tendency to stress cracking corrosion than pure PMMA (EP-A 508 173). A mixing ratio of 75% by weight of PMMA : 25% by weight of SAN has proven optimal.

Owing to the relatively high styrene and acrylonitrile content, these blends have only low weathering stability compared with PMMA. The addition of the conventional UV stabilizers, for example benzotriazoles, benzophenones or compounds of the HALS (hindered amine light stabilizer) type generally result in a reduction in the rate of yellowing but, regardless of this, the stress cracking resistance suffers during exposure to light. Observations to date have shown that even combinations of a benzotriazole and a HALS compound have no synergistic effect (cf. EP 243 319) on the resistance to chemicals.

It is an object of the present invention to provide molding materials having stress cracking resistance and improved weathering stability.

We have found that this object is achieved by the molding materials defined at the outset and having stress cracking resistance.

The polymers present as component A) are obtainable, according to the invention, by polymerizing a $C_1$–$C_{20}$-alkyl ester of methacrylic or acrylic acid or a mixture of said esters, preferably by polymerizing a monomer mixture consisting of $a_1$) from 80 to 100, preferably from 90 to 99, % by weight of a $C_1$–$C_{20}$-alkyl ester of methacrylic acid and $a_2$) from 0 to 20, preferably from 1 to 10, % by weight of a $C_1$–$C_{20}$-alkyl ester of acrylic acid.

Preferred $C_1$–$C_{20}$-alkyl esters of methacrylic acid are $C_1$–$C_4$-alkyl esters, such as methyl methacrylate (MMA), ethyl methacrylate, n-propyl methacrylate, isopropyl methacrylate, n-butyl methacrylate, isobutyl methacrylate and tert-butyl methacrylate, particularly preferably methyl methacrylate, as well as mixtures of these monomers.

Preferably used $C_1$–$C_{20}$-alkyl esters of acrylic acid are the $C_1$–$C_4$-alkyl esters, such as methyl acrylate (MA), ethyl acrylate, n-propyl acrylate, isopropyl acrylate, n-butyl acrylate, isobutyl acrylate and tertbutyl acrylate, particularly preferably methyl acrylate, as well as mixtures of these monomers.

Observations to date have shown that polymers which have proven particularly advantageous are those comprising 99% by weight of methyl methacrylate and 1% by weight of methyl acrylate and having a weight average molecular weight ($M_w$) of from 60,000 to 300,000, in particular from 80,000 to 150,000, g/mol, and those comprising 96% by weight of methyl methacrylate and 4% by weight of butyl acrylate and having a weight average molecular weight ($M_w$) of from 60,000 to 300,000, in particular from 110,000, g/mol.

The amount of component A is, according to the invention, from 49 to 99, preferably from 60 to 80, % by weight, based on the total weight of the transparent, impact-resistant molding materials.

Component A) is generally prepared by known polymerization methods, such as mass, solution, emulsion or bead polymerization. Such methods are described in, for example, Kunststoffhandbuch, Vol. 9, Vieweg und Esser; Polymethylmethacrylat, Carl-Hanser-Verlag, Munich 1975, page 36 et seq.

The copolymers (SAN copolymers) present as component B) are obtainable by polymerizing a monomer mixture comprising from 75 to 82, preferably from 78 to 81, % by weight by weight of a vinyl aromatic monomer and from 18 to 25, preferably from 19 to 22, % by weight of acrylonitrile or methacrylonitrile or a mixture thereof.

Outside this range of the composition, opaque shaped articles which have joint lines are generally obtained at processing temperatures above 240° C.

Preferred vinyl aromatic monomers are styrene, α-methylstyrene, tert-butylstyrene, monochlorostyrene and vinyltoluene, particularly preferably styrene and α-methylstyrene.

The addition of acrylonitrile and/or methacrylonitrile generally results in an increase in the stress cracking resistance.

SAN copolymers having a weight average molecular weight ($M_w$) of from 60,000 to 300,000, preferably from 100,000 to 200,000, g/mol and prepared by the method described in British Patent 1,472,195 have proven particularly suitable.

The amount of component B) is, according to the invention, from 0.95 to 50, preferably from 20 to 40, % by weight, based on the total weight of the transparent impact-resistant molding materials.

Component B) is prepared, as a rule, by known polymerization methods, such as mass, solution, emulsion or bead polymerization. Such methods are described in, for example, Kunststoffhandbuch, published by Vieweg and Daumiller, Volume V; Polystyrol, Carl-Hanser-Verlag, Munich 1969, page 124 et seq., and British Patent 1,472,195.

A mixture containing the components $c_1$) to $c_3$) and, if desired, $c_4$) is used as component C).

According to the invention, triaryl phosphites of the formula I

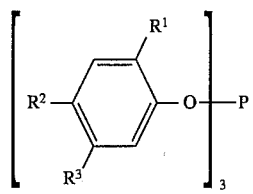

where $R^1$ and $R^2$ are each $C_1$–$C_{12}$-alkyl, such as methyl, ethyl, propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 1-methylhexyl, 2-methylhexyl, 3-methylhexyl, 4-methylhexyl, 5-methylhexyl, 1-ethylpentyl, 2-ethylpentyl, 1-propylbutyl, octyl, nonyl, decyl, undecyl and dodecyl, preferably $C_3$–$C_{12}$-alkyl branched in the 1-position (α), in particular $C_3$–$C_7$-alkyl, such as 1-methylethyl, 1-methylpropyl, 1,1-dimethylethyl, 1-methylbutyl, 1,2-dimethylpropyl, 1,1-dimethylpropyl, 1-ethylpropyl, 1-methylpentyl, 1,2-dimethylbutyl, 1,3-dimethylbutyl, 1,1-dimethylbutyl, 1,1,2-trimethylpropyl, 1,2,2-trimethylpropyl, 1-ethylbutyl, 1-ethyl-2-methylpropyl, 1-methylhexyl, 1-ethylpentyl or 1-propylbutyl, or 1,1,3,3-tetramethylbutyl or 1,1,2,2,5,5-hexamethylhexyl, $C_5$–$C_8$-cycloalkyl, such as cyclopentyl, cyclohexyl, cycloheptyl or cyclooctyl, preferably cyclohexyl, $C_6$–$C_{10}$-aryl or $C_6$–$C_{10}$-aryl-$C_1$–$C_4$-alkyl whose aryl radicals may be monosubstituted, disubstituted or trisubstituted by $C_1$–$C_4$-alkyl, eg. phenyl, naphthyl or 2,2-dimethylbenzyl, and $R^3$ is hydrogen or $C_1$–$C_4$-alkyl, such as methyl, ethyl, n-propyl, isopropyl, n-butyl, isobutyl, sec-butyl or tert-butyl, preferably hydrogen or methyl, are used as component $c_1$).

Examples of compounds I which are particularly important with regard to the present invention are the commercially available tris(2,4-di-tert-butylphenyl) phosphite (Irgafos® 168, Ciba Geigy) and tris(nonyl-phenyl) phosphite, preferably tris(2,4-di-tert-butyl-phenyl) phosphite.

According to the invention, an amine of the formula II

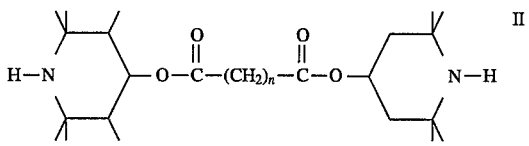

where n is from 2 to 10, preferably from 2 to 8, is used as component $c_2$). Compounds of this type are also known by the name HALS (hindered amine light stabilizer) compounds and are commercially available.

An example of compounds II which is particularly important with regard to the present invention is bis-(2,2,6,6-tetramethyl-4-piperidyl) sebacate (commercially available under the name Tinuvin® 770 DF (Ciba Geigy)).

According to the invention, a benzotriazole of the formula III

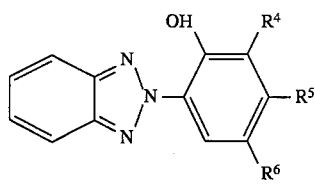

where $R^4$, $R^5$ and $R^6$ have the meanings of $R^1$, is used as component $c_3$).

Examples of compounds III which are particularly important with regard to the present invention are 2-(2'-hydroxy-5'-methylphenyl)-benzotriazole (commercially available under the name Tinuvin® P (Ciba-Geigy)) or 2-(2'-hydroxy-3'-dodecyl-5'-methyldecyl) benzotriazole.

A phenol of the general formula IV $$AB_k \qquad \qquad IV$$

where k is 1, 2 or 4 and, if k is 1, A is —COOR$^7$, —CONHR$^7$ or

where $R^7$ is $C_1$–$C_{21}$-alkyl, and, if k is 2, A is —CONH—$CH_2)_n$—CONH—, k is 4, A is

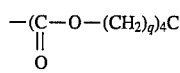

where q is an integer from 1 to 4, and B is

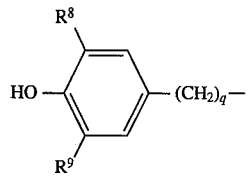

where $R^8$ and $R^9$ are each hydrogen, methyl or tert-butyl, can be used as component $c_4$), ie. an antioxidant.

The addition of component $c_4$) may in some cases lead to a further improvement in the stress cracking resistance after weathering.

Examples of compounds IV which are particularly important with regard to the present invention are octadecyl 3-(3,5-di-tert-butyl-4-hydroxyphenyl)-propionate (commercially available under the name Irganox® 1076 (Ciba Geigy)) and

IRGANOX 1098

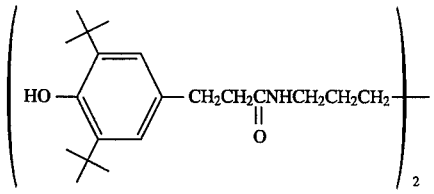

IRGANOX 1222

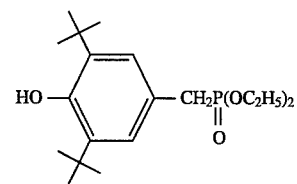

IRGANOX 259

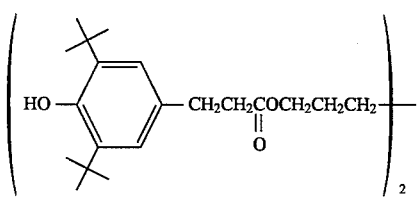

IRGANOX 1010

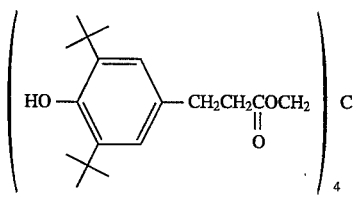

IRGANOX 245

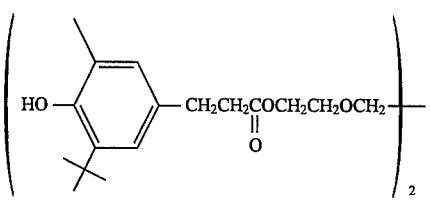

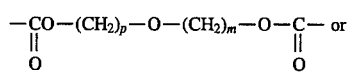
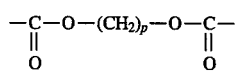

where p and m are each an integer of from 1 to 10, and, if

The presence of all three components $c_1$), $c_2$) and $c_3$) in component C) is essential for the invention. If at least one of the components $c_1$ to $c_3$) is absent, there is no synergistic effect with regard to the improvement in the stress cracking resistance after weathering.

The amounts of components $c_1$ to $c_3$ are each from 1 to 50, preferably from 30 to 50, % by weight, based on the sum of the amounts of components $c_1$ to $c_3$), the individual amounts summing to 100.

The amount of component $c_4$) is from 0 to 25, preferably from 10 to 25, % by weight, based on the total amount of components $c_1$) to $c_3$).

The amount of component C) is, according to the invention, from 0.05 to 1, preferably from 0.1 to 0.5, % by weight, based on the total weight of the molding materials having stress cracking resistance.

The novel molding materials may furthermore contain up to 20% by weight, based on the mixture of components A) to C), of conventional additives. Examples of suitable additives are: dyes; lubricants and mold release agents which may be added, as a rule, in an amount of up to 3% by weight, based on the thermoplastic material, for example stearic acid, stearates, stearyl alcohol, alkyl stearates and stearamides, as well as esters of pentaerythritol with long-chain fatty acids, and antistatic agents.

Components A) to C) can be mixed, as a rule, in the conventional apparatuses for mixing melts, eg. twin-screw extruders. The components are generally processed at from 200° to 300° C. In principle, it is also possible to mix solutions or suspensions of the novel components and subsequently to remove the solvent or suspending medium.

Observations to date have shown that the processing range of the novel, transparent, impact-resistant molding materials above 200° C. is not restricted by incompatibility phenomena. The mixtures of components A) to C) can be processed at from 200° to 300° C. without loss of transparency, without marked yellowing and without the formation of troublesome odors.

The novel molding materials can be converted into moldings by injection molding or blow molding. The molding materials may also be compression molded, calendered, extruded or vacuum formed.

The novel molding materials have very good stress cracking resistance on weathering compared with the prior art molding materials.

BRIEF DESCRIPTION OF THE DRAWING

The drawing sets forth a suitable apparatus for testing the stress cracking resistance of the molding materials.

EXAMPLES

The following components were used for the Examples and Comparative Examples below:

Components used

A: Copolymer of 99 parts by weight of methyl methacrylate (MMA) and 1 part by weight of methyl acrylate, $M_w$=110,000 (determined by light scattering in chloroform; viscosity number VN=74 ml/g, measured in 0.26% strength by weight solution in $CHCl_3$)

B: Copolymer of styrene and acrylonitrile in a ratio of 81:19 ($n^{25}_D$=1.575), $M_w$=250,000 (determined by light scattering in $CHCl_3$)

$c_1$: Tris(2,4-di-tert-butylphenyl) phosphite (Irgafos® 168 from Ciba Geigy)

$c_2$: Bis(2,2,6,6-tetramethyl-4-piperidyl) sebacate (Tinuvin® 770 DF from Ciba Geigy)

$c_3$: 2-(2'-hydroxy-5'-methylphenyl)-benzotriazole (Tinuvin® P from Ciba Geigy)

$c_4$: Octadecyl 3-(3,5-di-tert-butyl-4-hydroxyphenyl)-propionate (Irganox® 1076 from Ciba Geigy)

For the preparation of the novel molding materials, the components A) to C) were melted in an extruder (ZSK-25 from Werner & Pfleiderer, screw diameter 25 mm, length:diameter=30) according to their mixing ratio with a throughput of 10 kg/h at 240° C. and mixed at 200 rpm. The particular mixture was extruded and the extrudate was cooled and granulated.

Some of the granules were then processed in an injection molding machine (Allrounder from Arburg) at 200° C. to give dumbbells, as used for strength measurements according to DIN 53,455.

The stress cracking resistance is tested using an apparatus (cf. Figure) in which a standard dumbbell having the dimensions length 149 mm (after heating; before heating: 150 mm)

width 20 mm (at the end)

width 10 mm (center of dumbbell)

height 4 mm was fixed horizontally at one end. A support, consisting of a rod having a diameter of 5 mm and arranged perpendicular to the longitudinal direction and parallel to the transverse direction of the test specimen at a distance of 70 mm from the fixed end of the test specimen, served as the second holding means.

A weight of 509 g was applied at the free end of the test specimen. A flexural stress $\sigma_F$ of 147.87 N/cm² was thus generated at the rod support. The calculation was carried out using $$\sigma_F = \frac{F \cdot l \cdot 6}{w \cdot h^2}$$

(from Technische Formelsammlung, K. Gieck-Verlag, Heilbronn, 1972, page P3)

where $\sigma_F$=Flexural stress in N/cm² w=Sample width in cm (measured in the center of the dumbbell)

h=Height of the sample l=Support distance in cm

F=Force in N=509 g·980.665·10⁻⁵ N/g=4.9916 N.

Before the test, the dumbbells were heated for 20 hours at 10° C. below their Vicat temperatures (air) in a drying oven containing silica gel, in order to obtain stress-free dumbbells. After the heating process, the sample pieces were cooled to the measuring temperature of 23° C in a desiccator containing silica gel and was stored there until the measurement.

The test specimens pretreated in this manner were first subjected to the abovementioned force for 10 minutes and then, with continued loading, were brought into contact with the mixture of water and isopropanol (50/50% by volume) to produce the stress corrosion.

The isopropanol was applied to the surface of the stressed part of the dumbbell at the level of the support rod. In order to ensure good contact between the test medium and the plastics surface, a 1 cm long and 1 cm wide piece of filter paper was placed at this point. This filter paper was kept continuously moist with isopropanol as the test liquid during the measuring period.

The time from the beginning of moistening to the occurrence of the first stress crack was measured. 10 test specimens of each of the mixtures were used for a test series. The arithmetic mean of the measured times was calculated in each case.

The weathering resistance was tested according to DIN 53,384-A-8-60, by first exposing the test specimens to UV light for 0, 500, 1,000 and 2,000 hours in each case. The stress cracking resistance was then determined as described above.

The weathering resistance is expressed in terms of the stress cracking resistance after exposure to light. The stress cracking resistance means that the test specimens exhibit the first stress cracks only after the time stated in the Table.

The results are summarized in the Table.

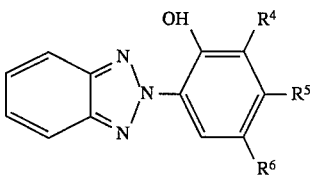

where $R^4$, $R^5$ and $R^6$ have the meanings of $R^1$, and optionally $c_4$) a phenol of the formula IV

TABLE

Stress cracking resistance and weathering resistance

| Example | Composition of the molding materials (% by weight) | | | | | | Stress cracking resistance (sec) (after 0, 500, 1,000 and 2,000 h exposure to light) | | | |
| --- | --- | --- | --- | --- | --- | --- | --- | --- | --- | --- |
| | A | B | $C_1$ | $C_2$ | $C_3$ | $C_4$ | 0 | 500 | 1,000 | 2,000 |
| 1 | 74.9600 | 24.9905 | 0.0165 | 0.0165 | 0.0165 | — | 750 | 720 | 700 | 680 |
| 2 | 74.9200 | 24.9810 | 0.0330 | 0.0330 | 0.0330 | — | 680 | 650 | 600 | 540 |
| 3 | 74.9200 | 24.9800 | 0.0250 | 0.0250 | 0.0500 | — | 690 | 670 | 625 | 590 |
| 4 | 74.9200 | 24.9800 | 0.0250 | 0.0250 | 0.0250 | 0.0250 | 700 | 690 | 690 | 670 |
| For comparison | | | | | | | | | | |
| 5 | 74.9200 | 24.9800 | — | 0.0500 | 0.0500 | — | 690 | 490 | 275 | 110 |
| 6 | 74.8500 | 24.9500 | 0.1000 | — | 0.1000 | — | 680 | 310 | 175 | 120 |
| 7 | 74.9200 | 24.9800 | 0.0800 | — | — | 0.0200 | 700 | 80 | 70 | 50 |

We claim:

1. A molding material having stress cracking resistance and containing essentially A) from 49 to 99% by weight of a polymer obtainable by polymerizing a $C_1$–$C_{20}$-alkyl ester of methacrylic or acrylic acid or a mixture of said esters, B) from 0.95 to 50% by weight of a polymer obtainable by polymerizing a monomer mixture comprising $b_1$) from 75 to 82% by weight of a vinyl aromatic monomer and $b_2$) from 18 to 25% by weight of acrylonitrile or methacrylonitrile or a mixture thereof, and C) from 0.05 to 1% by weight of a mixture containing $c_1$) a triaryl phosphite of the formula I

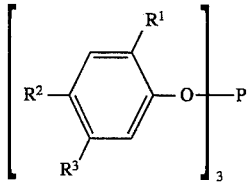

where $R^1$ and $R^2$ are each $C_1$–$C_{12}$-alkyl, $C_5$–$C_8$-cycloalkyl, $C_6$–$C_{10}$-aryl or $C_6$–$C_{10}$-aryl-$C_1$–$C_4$-alkyl, where the aryl radicals may be monosubstituted, disubstituted or trisubstituted by $C_1$–$C_4$-alkyl, and $R^3$ is hydrogen or $C_1$–$C_4$-alkyl, $c_2$) an amine of the formula II

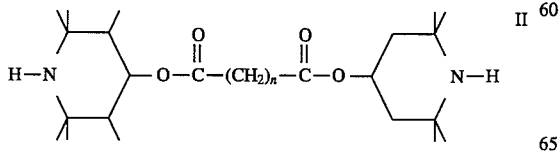

where n is from 2 to 10, $c_3$) a benzotriazole of the formula III $AB_k$ IV where k is 1, 2 or 4 and, if k is 1, A is —$COOR^7$, —$CONHR^7$ or

where $R^7$ is $C_1$–$C_{21}$-alkyl, and, if k is 2, A is —CONH—$(CH_2)_n$—CONH—,

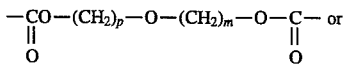

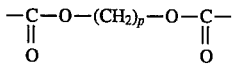

where p and m are each an integer of from 1 to 10, and, if k is 4, A is

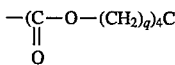

where q is an integer of from 1 to 4, and B is

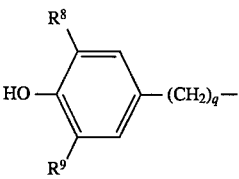

where $R^8$ and $R^9$ are each hydrogen, methyl or tert-butyl.

2. A molding material having stress cracking resistance, as defined in claim 1, wherein the components $c_1$ to $c_3$ are each present in an amount of from 1 to 50% by weight, based on the total amount of components $c_1$ to $c_3$, with the proviso that the amounts sum to 100, and the mixture contains up to 25% by weight, based on the total amount of components $c_1$ to $c_3$, of component $c_4$.

3. A molding material having stress cracking resistance, as defined in claim 1, wherein component A) is prepared from a monomer mixture comprising $a_1$) from 80 to 100% by weight of a $C_1$–$C_{20}$-alkyl ester of methacrylic acid and $a_2$) from 0 to 20% by weight of a $C_1$–$C_{20}$-alkyl ester of acrylic acid.

4. A molding material as defined in claim 1, wherein component $C_4$ is present in the amount of 10 to 25% by weight based on the total weight of components $C_1$ to $C_3$.

5. A molding material as defined in claim 4, wherein component $C_4$ is

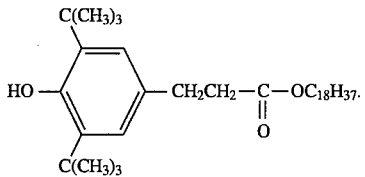

6. A molding material as defined in claim 1, wherein components $C_1$ to $C_3$ present in amounts of from 30 to 50% by weight based on the total weight of components $C_1$ to $C_3$.

* * * * *